US009800726B2

(12) United States Patent
Patel (10) Patent No.: US 9,800,726 B2
(45) Date of Patent: Oct. 24, 2017

(54) ROUTING NON-VOICE INTERACTIONS IN CALL CENTERS OR CONTACT CENTERS VIA EXISTING TRADITIONAL COMPUTER TELEPHONE INTEGRATION SYSTEMS

(71) Applicant: INTEGRATED SYSTEMS SOLUTIONS, INC, San Francisco, CA (US)

(72) Inventor: Surilkumar Pravinchandra Patel, Sterling Heights, MI (US)

(73) Assignee: INTEGRATED SYSTEMS SOLUTIONS, INC., San Francisco, CA (US)

(\*) Notice: Subject to any disclaimer, the term of this patent is extended or adjusted under 35 U.S.C. 154(b) by 0 days.

(21) Appl. No.: 15/348,577

(22) Filed: Nov. 10, 2016

(65) Prior Publication Data

US 2017/0085712 A1    Mar. 23, 2017

Related U.S. Application Data (62) Division of application No. 14/862,946, filed on Sep. 23, 2015, now abandoned.

(51) Int. Cl.
| | |
|---|---|
| *H04M 3/00* | (2006.01) |
| *H04M 3/51* | (2006.01) |
| *H04L 29/12* | (2006.01) |
| *H04M 3/523* | (2006.01) |
| *H04M 7/00* | (2006.01) |

(52) U.S. Cl.
CPC ........ *H04M 3/5183* (2013.01); *H04L 61/157* (2013.01); *H04L 61/605* (2013.01); *H04M 3/5166* (2013.01); *H04M 3/5231* (2013.01); *H04M 3/5235* (2013.01); *H04M 3/5141* (2013.01); *H04M 7/0039* (2013.01); *H04M 2201/50* (2013.01)

(58) Field of Classification Search
CPC .................................................... H04M 3/5183
USPC ...... 379/265.01–265.14, 266.01–266.1, 309; 379/201.01
See application file for complete search history.

(56) References Cited

U.S. PATENT DOCUMENTS

| | | | |
|---|---|---|---|
| 5,706,211 | A | 1/1998 | Beletic et al. |
| 5,894,512 | A | 4/1999 | Zenner |
| 5,926,538 | A | 7/1999 | Deryugin et al. |
| 6,021,428 | A | 2/2000 | Miloslavsky |
| 6,259,774 | B1 | 7/2001 | Miloslavsky |
| 6,711,249 | B2 | 3/2004 | Weissman et al. |
| 7,584,244 | B2 | 9/2009 | Forstadius |
| 2002/0138340 | A1 | 9/2002 | Ikezawa et al. |
| 2003/0174829 | A1 | 9/2003 | Dezonno et al. |
| 2005/0129212 | A1 | 6/2005 | Parker |
| 2006/0251233 | A1 | 11/2006 | Mott |
| 2012/0057688 | A1 | 3/2012 | Pickering |
| 2015/0207932 | A1 | 7/2015 | Fiedorowicz et al. |
| 2015/0312412 | A1* | 10/2015 | Cahill ................. H04M 3/5191 379/265.09 |

\* cited by examiner

*Primary Examiner* — William Deane, Jr.
(74) *Attorney, Agent, or Firm* — Westerman, Hattori, Daniels & Adrian, LLP (57) ABSTRACT

A method(s) and system(s) through which non-voice interactions or activities can be routed through existing systems presently utilized for voice (or telephone call) routing.

10 Claims, 9 Drawing Sheets

Table: videoCall — 701

| Column Name | Type | Remarks |
|---|---|---|
| vidID | integer, unique, primary key | |
| RequestTime | datetime | |
| CustomerName | varchar | |
| CustomerReason | varchar | |
| CustomerAccount | varchar | |
| CustomerLocation | varchar | |
| CustomerLanguage | varchar | can be enforced as unique or as composite key with RequestTime or other |
| spoofANI_CLI | varchar | |
| videoMeetingID | varchar | |
| TargetAgentID | integer | |
| TargetPlaceID | integer | |
| AgentExtension | varchar | |
| AgentIPAddress | varchar | |
| RouteTime | datetime | |

Sample Row — 702

| vidID | RequestTime | CustomerName | CustomerReason | CustomerAccount | CustomerLocation | CustomerLanguage |
|---|---|---|---|---|---|---|
| 141 | 2014-07-18 16:38:36.497 | Suril Patel | IRA | 1276683 | NY | English |

| spoofANI_CLI | videoMeetingID | TargetAgentID | TargetPlaceID | AgentExtension | AgentIPAddress | RouteTime |
|---|---|---|---|---|---|---|
| 555-080-0141 | tD1V4knvxpcf | 13112 | pic_8501 | 8501 | 10.1.1.53 | 2014-07-18 16:39:34.417 |

Table: activityRequest (901)

| Column Name | Type | Remarks |
|---|---|---|
| actID | integer, unique, primary key | |
| RequestTime | datetime | |
| CustomerName | varchar | |
| CustomerReason | varchar | |
| CustomerAccount | varchar | |
| CustomerLocation | varchar | |
| CustomerLanguage | varchar | |
| spoofANI_CLI | varchar | can be enforced as unique or as composite key with RequestTime or other |
| activityType | varchar | |
| activityUniqueID | varchar | |
| activityMessage | varchar | |
| TargetAgentID | integer | |
| TargetPlaceID | integer | |
| AgentExtension | varchar | |
| AgentIPAddress | varchar | |
| RouteTime | datetime | |

Sample Rows (902)

| actID | RequestTime | CustomerName | CustomerReason | CustomerAccount | CustomerLocation | CustomerLanguage | spoofANI_CLI | activityType | activityUniqueID | activityMessage | TargetAgentID | TargetPlaceID | AgentExtension | AgentIPAddress | RouteTime |
|---|---|---|---|---|---|---|---|---|---|---|---|---|---|---|---|
| 141 | 2014-07-18 16:38:36.497 | Sunil Patel | IRA | 1276683 | NY | English | 555-000-0141 | video conference | t01v3knvxpcf | connectToVidyo | 13112 | plc_8501 | 8501 | 10.1.1.53 | 2014-07-18 16:39:34.417 |
| 142 | 2014-07-18 16:48:36.497 | Sunil Patel | Billing | 1276683 | NY | English | 555-000-0142 | mail letter | stmt.204983984 | mail statement | 13117 | plc_8504 | 8504 | 10.1.1.83 | 2014-07-18 16:49:34.417 |

ROUTING NON-VOICE INTERACTIONS IN CALL CENTERS OR CONTACT CENTERS VIA EXISTING TRADITIONAL COMPUTER TELEPHONE INTEGRATION SYSTEMS

CROSS-REFERENCE TO RELATED APPLICATION

This application is a Divisional of copending U.S. patent application Ser. No. 14/862,946, filed on Sep. 23, 2015, which claims priority under 35 U.S.C. 119(e) to Provisional Application No. 62/054,060 filed. Sep. 23, 2014, the contents of which are incorporated herein by reference in their entirety.

FIELD OF THE INVENTION

The present invention relates generally to the field of call centers, also known as contact centers, and more particularly but not by way of limitation, to the assignment, also known as routing, of non-voice interactions, such as video, through contact systems that traditionally only support voice interactions, namely phone calls, to contact center employees.

BACKGROUND OF THE INVENTION

Call Centers, contact centers, and/or various multi-agent entities receive telephone calls. These telephone calls are processed by systems and are assigned to agents, who will then engage in communication with the calling party. The telephone call is often referred to as a 'voice interaction'. The selection and assignment of the call, to an agent, from a population of many agents is referred to as 'routing'. Routing can occur in many variations or via many algorithms, such as, but not limited to, a simple queue. Each call enters a queue, while agents are answering calls. After an agent finishes one call, or if the agent is 'available', he or she can be assigned the next call from the queue.

Routing can also be more complex, where the assignment of the voice interaction to an agent can involve other data elements. For example, if it is known that calling party is from Spain, then the system may be configured to only assign such a call to an agent which speaks Spanish. Routing may employ the use of computers or databases to perform data queries or execute other logic, such as identification f the language skills of each member of the agent pool, as previously noted. Data elements regarding the particular voice interaction may be captured, stored, and presented to the agent receiving the call, which in some cases occurs on the display of the agent's computer system. Systems and methods which perform routing are often expensive investments and may sometimes be categorized as computer telephony integration systems.

Communication to agents within call centers, contact centers, multi-agent entities has over the years began taking place over different communication mediums. These mediums include, but are not limited to, internet-based chat, e-mail, two-way video communication or conferencing, and SMS. The objectives of assigning each of these non-telephone calls or non-voice interactions to an agent, remains prevalent. Some routing systems or computer telephony integration systems have built-in capability to process, and propagate the data elements of, these non voice interactions. Others miry require implementation of additional tools, systems, software, or components, or in some cases replacement of the existing system.

Communication mediums such as, but not limited to, video conferencing, may be occasionally desired by either party in the aforementioned call centers, contact centers, or multi-agent entities. Various systems, methods, tools, or components may be available at both endpoints of the interaction (to the agent and to originating party), however routing must be performed to assign the originating party to the agent. It may be desirable to be able to perform such routing using the existing routing or computer telephony integration system, without incurring additional costs or requiring specific changes, upgrades, augmentation, modifications, additional components, additional systems, or additional methods. System acts (or users) may accept or allow for certain changes or, certain costs, to achieve desired functionality. It may also be desired to have agents and existing systems process phone calls and voice interactions, while also processing non-voice interactions and activities, within the same system, utilizing the same agent pool.

To help the reader, below is a table of commonly known acronyms explain

| | |
|---|---|
| ACW | After Call Work |
| ANI | Automatic Number Identification |
| CLI | Calling Line Identification (also written as CLID) |
| CTI | Computer Telephony Integration |
| DB | Database |
| DBMS | Database Management System |
| DS3 | Digital Subscriber III - a type digital carrier line that may carry over 600 telephone voice channels |
| Firefox | A internet web browser made by Mozilla ™ |
| H.323 | A known communication protocol |
| HTTP | Hyper Text Transfer Protocol |
| IP | Internet Protocol |
| IP Address | Internet Protocol Address |
| ISDN | Integrated Services Digital Network |
| IVR | Interactive Voice Response |
| JMS | Java Message Service |
| LAN | Local Area Network |
| PBX | Private Branch eXchange |
| POTS | Plain Old Telephone System |
| PSTN | Public Switched Telephone Network |
| RAM | Random Access Memory |
| REST | Representantional State Transfer |
| RPC | Remote Procedure Call |
| SCCP | Skinny Call Control Protocol |
| SIMPLE | Session Initiation Protocol for Instant Messaging and Presence Leveraging Extensions |
| SIP | Session Information Protocol |
| SMS | Short Messaging Service |
| SOAP | Simple Object Access Protocol |
| SQL | Structured Query Language |
| SS7 | Signaling System Seven - a protocol used in telephony |
| TDM | Time Division Multiplexing |
| URL | Uniform Resource Locator |
| UUI | User to User Information |
| VDI | Virtual Desktop Infrastructure |
| VM | Virtual Machine |
| VMDK | Virtual Machine Disk |
| WAN | Wide Area Network |
| XML | eXtensible Markup Language |
| XMPP | eXtensible Messaging and Presence Protocol |

In a video conferencing embodiment of the invention, the use of SIP is described as communication protocol often accepted in contact centers. In some instances. Contact center software and/or hardware systems may natively support video communication within the SIP protocol. However, not all contact center systems have capability to support SIP Video, even if they support SIP, and thus this video conferencing embodiment provides a viable alternate solution. Similarly, a contact center system may not support web-based chat. Some contact center systems only support voice (or telephone calls) as the communication medium.

Allowing additional communication mediums, would require that the software or system would able to understand protocols and messages of the other system. Specifically, the system which receives the request or call on that communication medium would need to be able to process that medium. The agent also needs to be able to communicate on that medium. And an important aspect is that the routing system needs to monitor availability on the supported mediums. By this, if an agent is communicating on the Chat medium with a customer already, the routing system should know this, so that it does not assign another customer to that agent.

Contact centers might mix or blend the type of communication mediums an agent might encounter. An agent might be busy chatting with a customer, and that chat conversation, the agent is then considered available. The routing system may then assign the agent to a voice call. Some systems support routing and monitoring capabilities across multiple communication mediums like this, and others do not. Some systems may offer upgrades to expand the traditional voice telephony and add the chat functionality. Sometimes such non-voice communication mediums are considered a "multimedia", which can entail adding server or software components, which are maybe costly. Communications may further be categorized as activities, wherein there e communication, such as voice or video, but also a customer service task, such as mailing a financial statement and cover letter. The aforementioned capabilities are sometimes sold by the original vendor of the contact center. This is much like additional features in a vehicle. Sometimes $3^{rd}$ parties also try to produce these.

Hence, there is a need in the art method, system, and/or component to allow for the, routing of non-voice interactions and activities, such as but not limited to video conferencing, to occur on routing or computer telephony integration systems that do not presently support those non-voice interactions.

BRIEF SUMMARY OF THE INVENTION

In view the stated problems, it is one aspect of the present invention to provide methods and systems through which non-voice interactions or activities can be routed through existing systems presently utilized for voice (or telephone call) routing.

Another aspect of the present invention is to provide methods, and non-transitory computer readable media that are used to assign the one or more non-voice interactions to a plurality of agents. Another aspect of the present invention is to provide a method which includes receiving an invocation, request, demand, or initiation to the multi-agent entity for interaction or communication to take place using two-way video, also known as 'video conferencing' or 'video chat'. Agents routinely respond to telephone calls according to this aspect and a routing or computer telephony integration system exists through which agents are assigned these voice interactions. According to this aspect of the present invention when a video chat 'request' is received from an originating party a corresponding 'dummy call' is generated to the existing telephony, routing, and integration systems. The 'dummy call' will mimic the behavior of traditional supported telephone call or voice interaction as required and relevant.

According to another aspect of the present invention, details regarding the request and the dummy call will be stored in non-transitory computer readable media, such as, but not limited to, a database. The dummy call will begin processing through the routing and/or CTI (computer telephony integration) system. As part of the processing, the CTI/routing system will query the machine-readable storage media used by the component that generated the dummy call. Data elements and/or information obtained via this query will be noted into routing/CTI system. An agent will be selected and assumed this call. The agent's system will be notified that the assigned call is a dummy call, which according to this aspect of the present invention a vehicle to initiating a video chat between the agent and originating/requesting party.

According to another aspect of the invention, the data presented to the agent could contain a unique identifier, such as but not limited to a Uniform Address Locator ('URL'), where the agent can carry out the video communication.

According to another aspect of the invention, the system or component which generates the dummy call can predefine the channel, unique identifier, or location through which the video communication will occur for the particular interaction. It is another aspect of the present invention that the agent's system may also store corresponding information to the interaction in the same storage media as used by generating system.

BRIEF DESCRIPTION OF THE DRAWINGS

These and other object and advantages of this invention will be more completely understood and appreciated by careful study of the following more detailed description of exemplary embodiments of the invention taken in conjunction with the accompanying drawings, in which.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

Embodiments of the present invention include methods, stems, and non-transitory computer readable media for allowing call centers, contact centers, and multi-agent entities to support previously unsupported communication and messaging or assignment of data, non-voice interactions, or work items. This is done using the protocols and signaling methods of the already supported communication mediums or interactions. Attributes within these protocols or signaling instances ant, strategically manipulated, to allow them carry and convey references and details to the non-supported communication mediums, messages, interactions. These details are decoded appropriately in the process, and used to establish other communication channels, perform further signaling, notifications, work flow item, etc. In this way, information can flow through an existing CTI system, which can be utilized to introduce greater functionality into the system. In one embodiment, a work flow item could consist of establishing a video chat with one or more parties. Thus, in such an embodiment the functionality of video chat is added to a system generally used for telephone calls and routing voice-based interactions.

Figure 1:
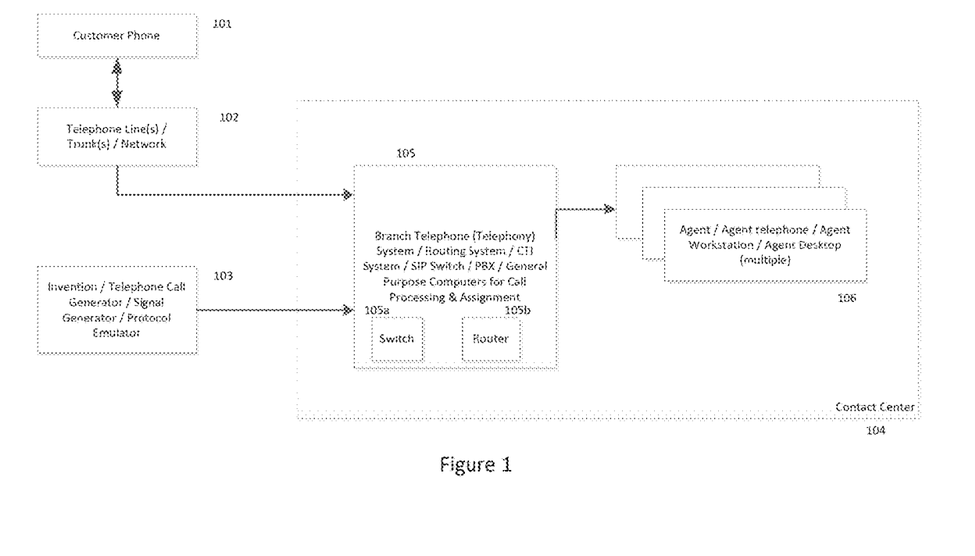
FIG. 1 illustrates the system topology at a call center, contact center, or multi-agent entity and how embodiments of the present invention interact externally with an existing system.

FIG. 1 illustrates the system topology at a call center, contact center or multi agent entity and how embodiments of the present invention interact externally with an exist stem. In an example contact center, such is a bank: Customers will call the bank's 800-xxx-xxxx telephone number and call will be delivered to the bank via tone lines or carrier trunks (ex. AT&T™ DS3 it or a Level3™ SIP Trunk). In the FIG. 1, the Customer 101 represents the customer phone (which could be landline, mobile, VoIP or other platform), which thus connects to a network 102 (such as the Public Switched Telephony Network or the Internet). Here, the network 102 can direct calls to, contact center systems that handle telephony, 105, in a variety of ways (including, but not limited to analog phone lines, digital phone lines, or a SIP trunk). Let us in just one sub-example, declare that it is a carrier-based SIP Trunk. The trunk communicates to SIP "Switch", such as Genesys™ SIP Server, which thus receives the customer call. In FIG. 1 a Switch 105*a* is used, which is a component of the contact center system(s). The call is now in the possession of SIP Server, which needs to decide where to send the call, which ultimately would be an agent or an employee of the bank. Before deciding, it may prompt the customer with some questions and play some audio messages to him/her. The process of selecting the agent, based on criteria and availability, known as "routing" will take place. As a sub-example, Genesys™ SIP server leverages Genesys™ Universal Routing Server (URS) to carry out this routing function. In the figure, the component which carries this routing function is often referred to as a router 105*b*. URS, one commonly known router, identifies the agent and instructs SIP Server to send the call, which it currently "possesses", to the specific agent. In the figure, the agent 106 may include any or multiple of the following, a hardware telephone, a software-based phone, a workstation, a mobile phone, etc. SIP Server thus connects the customer to the agent, applying the specific protocol communication necessary to do so. This is the general life cycle of the call, namely: 1) Call arrives, 2) Routing & Target selected, 3) Call rings on agent phone, 4) Customer & Agent are now in conversation Some contact centers have more advanced systems and tools, which all the same group of agents to also engage in conversations using Chat. Sometimes the agents also answer emails. Sometimes it is the same agent that may take a call, followed by an email, then a call again. Sometimes the type of work is separated between agents. Various versions of the above system are in the market today, and some are more advanced than others, allowing more mediums of communications as well as routing tasks, as discussed above.

Various embodiments of the present invention allow a system that is presently configured or licensed only voice (or one specific medium), to now be extended into other mediums. More specifically, a "connector" system is provided according to an embodiment of the present invention, that can augment the capabilities of known contact center contact center software packages to add the capability to route a URL (uniform resource locator) for the agent, or agent's system, to open. This URL in, one embodiment, references a video conferencing virtual conference room. As the customer also joins this same virtual conference room, it in effect allows an agent to video conference with a customer. This "connector", which is a component of the various embodiments for the present invention is referred to as the Interaction Request Server, the Integration Server, and the Interaction Server. It may be referred to as other names, such as "adaptor", but all named representations can be summarized as software (machine readable code and instructions) that will be executed by hardware (a computer system, workstation, virtual machine or virtual server instance). It may also leverage or contain within, components such as a phone call generator.

Figure 2:
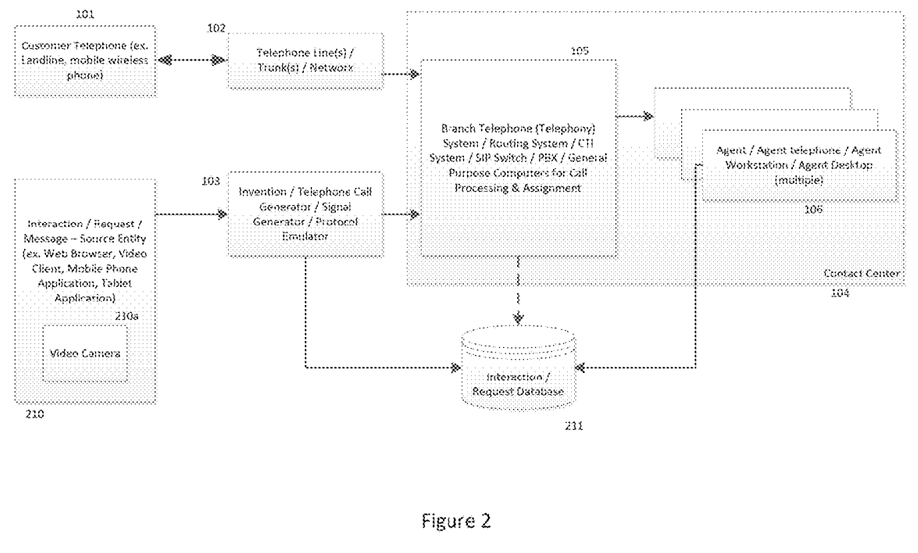
FIG. 2 is a block diagram it rating components of an exemplary environment in which various embodiments of the present invention may be implemented.

FIG. 2 is a block diagram illustrating components of an exemplary environment in which various embodiments of the present invention may be implemented. This topology shows that an external entity, namely a customer, may request an intertaction that is not voice—such as video. Just as customers can use their mobile phones or landline phones 101, to reach a contact center 104 (an entity effectively, though not always physically, containing contact center system(s) and agents); they can also start a request to communicate from their web browser, mobile phone application, tablet application, or similar external client hardware or software interface 210. In a video embodiment according to the present invention, the customer will click (or by similar means) initiate the request. This request is received by software, code, programming, or system which then catalogs the request. Relevant data is stored in a database 211, with a unique key. Various embodiments of the present invention involve creating the call or messaging to the contact center system, which will route the call or message/protocol as usual. The agent receives the call or message, but also has access and ability to reference or retrieve the data linked to the system-generated "dummy" call. In a video embodiment, as information regarding the customer is available to the agent or the agent's system, the agent 106 can enter into a video conference engaging the customer's video camera 210*a*.

Figure 3:
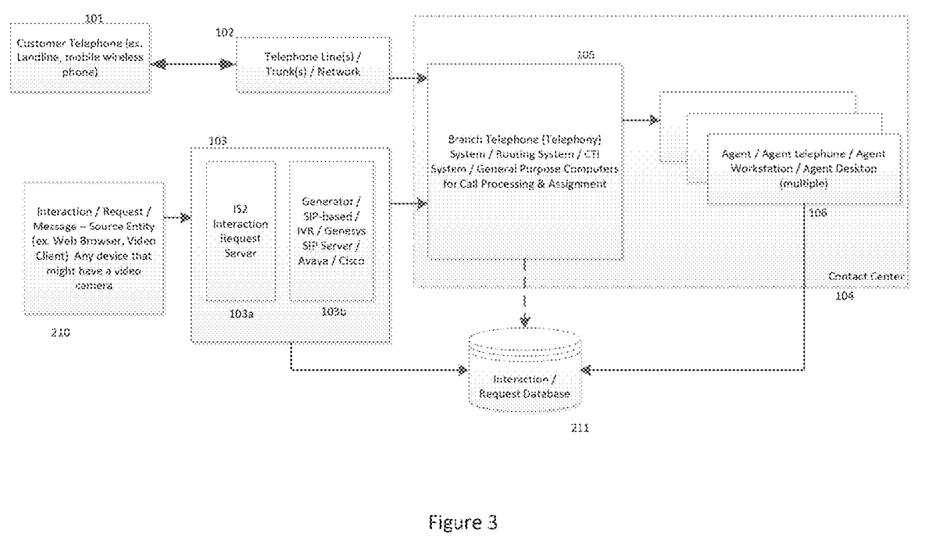
FIG. 3 is another block diagram illustrating components of an exemplary environment in which various embodiments of the present invention in implemented.

FIG. 3 is another block diagram illustrating components of an exemplary environment in which various embodiments of the present invention may be implemented. The request from the customer's device (browser, mobile phone, tablet, etc, etc) is handled and managed by a server software component which we can name the Interaction Request Server 103*a*. The Interaction Request Server 103*a* responds to, and manages requests. This component will uniquely catalog the request as, entailed, but can work with existing tool(s), component(s), or any system(s) 103*b* to generate the call, message, or protocols. In other words, in one embodiment, the complete implementation of the communication generator engine is not needed. Instead, it is only necessary to provide adequate management capability, in its code or program, to successfully manage or facilitate the receipt of the request, the cataloging, the generation, and the referencing of the data by the agent. In other words, the Interaction Request Server 103a can simply issue commands, appropriately parameterized, to existing or other procurable systems (or software) which can generate the call or message. Thus, the utilities of the interaction request server 103a and call generator 103b, may or may not physically exist as one entity, within one physical medium, virtual medium or one software unit, but can be grouped logically into an entity we may later name the integration server 103.

In one embodiment, it is foreseeable that the Interaction Request server 103a can use the capabilities of an IVR (Interactive Voice Response system), such as the Genesys™ Voice Platform, to generate such call or to generate SIP messages, invites, calls, etc. As the ultimate goal is to spawn a routable entity of any routable medium, this generating component could also be a scriptable email server, in another embodiment.

Figure 4:
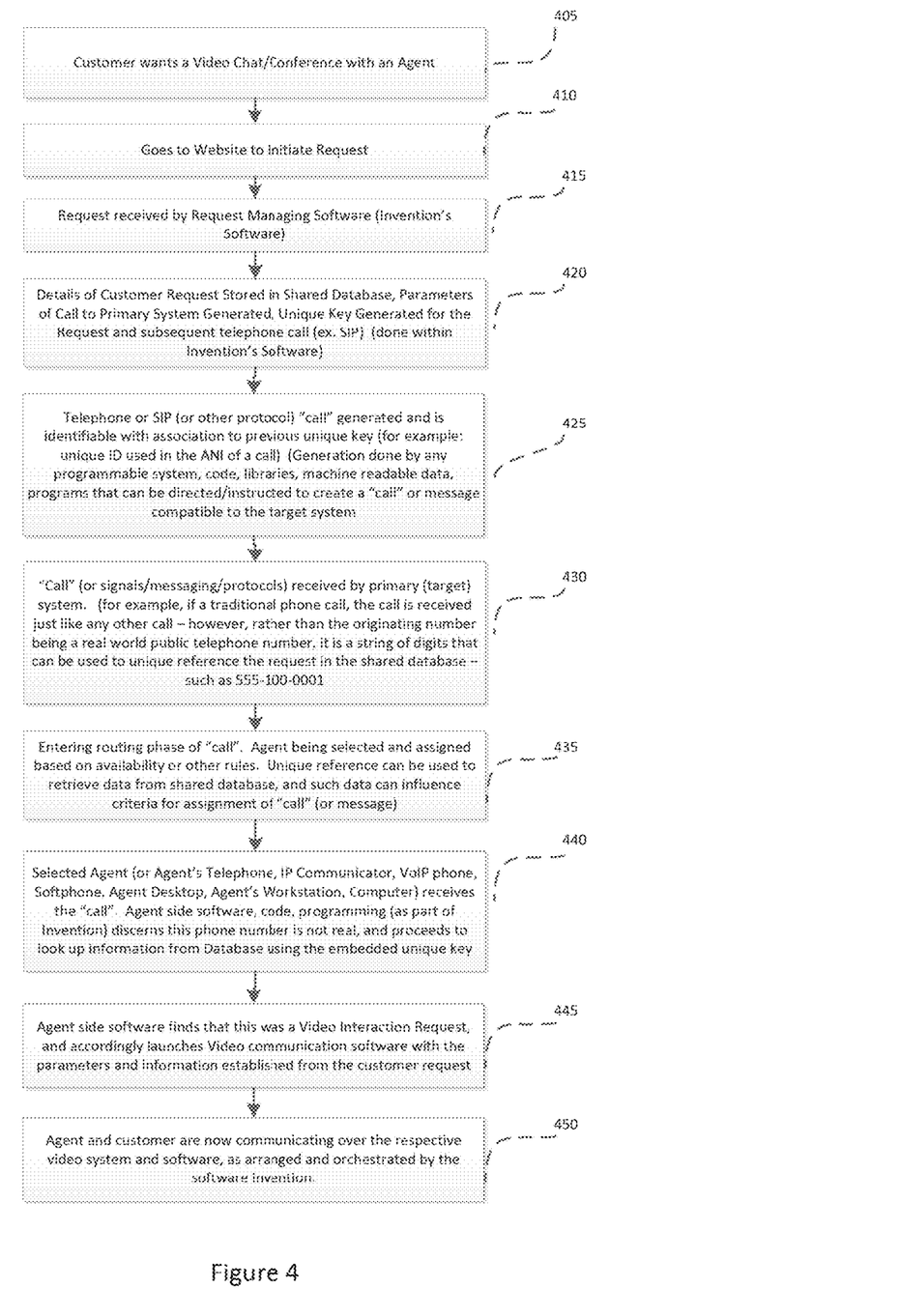
FIG. 4 is a flowchart illustrating the request, message, or interaction assignment process according to an embodiment of the present invention.

FIG. 4 is a flowchart illustrating the request, message, or interaction assignment process according to an embodiment of the present invention. For example, the details regarding a video embodiment, which includes routing a URL task or a video room ID to the agent is shown in FIG. 4. As discussed above with reference to FIG. 1, contact centers may use digital trunks (TDM) or IP (SIP) trunks from the carrier. Further to that, if the primary phone system in the contact center uses TDM, it is often possible to have Gateway. This Gateway will convert SIP to TDM, bi-directionally. This methodology is in use in many contact centers, where soft-switch components like Genesys™ SIP Server are installed.

As indicated in FIG. 4, a request is received for a video chat 415, after the customer wants to chat 405 an invokes a request from the website 410. In a specific implementation for Vidyo™, Inc., a virtual conference room ("vidyo room") is decided for the request, after the relevant data is stored in the database 420. In the same implementation, a SIP protocol INVITE is sent to SIP Server (or switch) 425. In this implementation, an external system is not used for this, but the code to do this, is contained within the server program. The INVITE is received by SIP Server on the desired "Route Point" (430). In a TDM-based contact center, the Route Point would relay the call over to TDM Switch (via the Gateway), and it would show up as a voice call on a route point there. Whichever switch has the agents connected, would be where the routing actually takes place, to connect the call or INVITE to the agents. In one configuration, the header message of the INVITE contains "from: <ani>@<ip_address>". ANI or user in this case, refers to the origin. Very often the configuration in contact centers is that this a phone number. Suppose a customer with a phone number of 586-604-1234 called a contact center. The IP trunk would send a SIP INVITE with "from: 5866041234@<ip_address> to the SIP Server or Sip Switch. In the configuration for the IS2 implementation, the system generates the INVITE as "from: <db_row_id>@ip_address>". Genesys™ URS (a "router", as previously described) is asked to find the ANI, to which it actually retrieves the Database Row ID of the entry created by, interaction Request Server. This allows the URS to query the database to retrieve that row and the relevant details from it. This data is "attached" internally within Genesys™ (software platform and ecosystem) to this interaction request.

As detailed in FIG. 4, the flow continues and routing completes 435. The appropriate agent receives the call 440 and his/her system acts upon data previously stored by the Interaction Request Server. As the call is identified to be for the purpose of a video medium, software execution of launching video communication software occurs on the agent system 445. The agent effectively joins a video conference with the customer 450.

Figure 5:
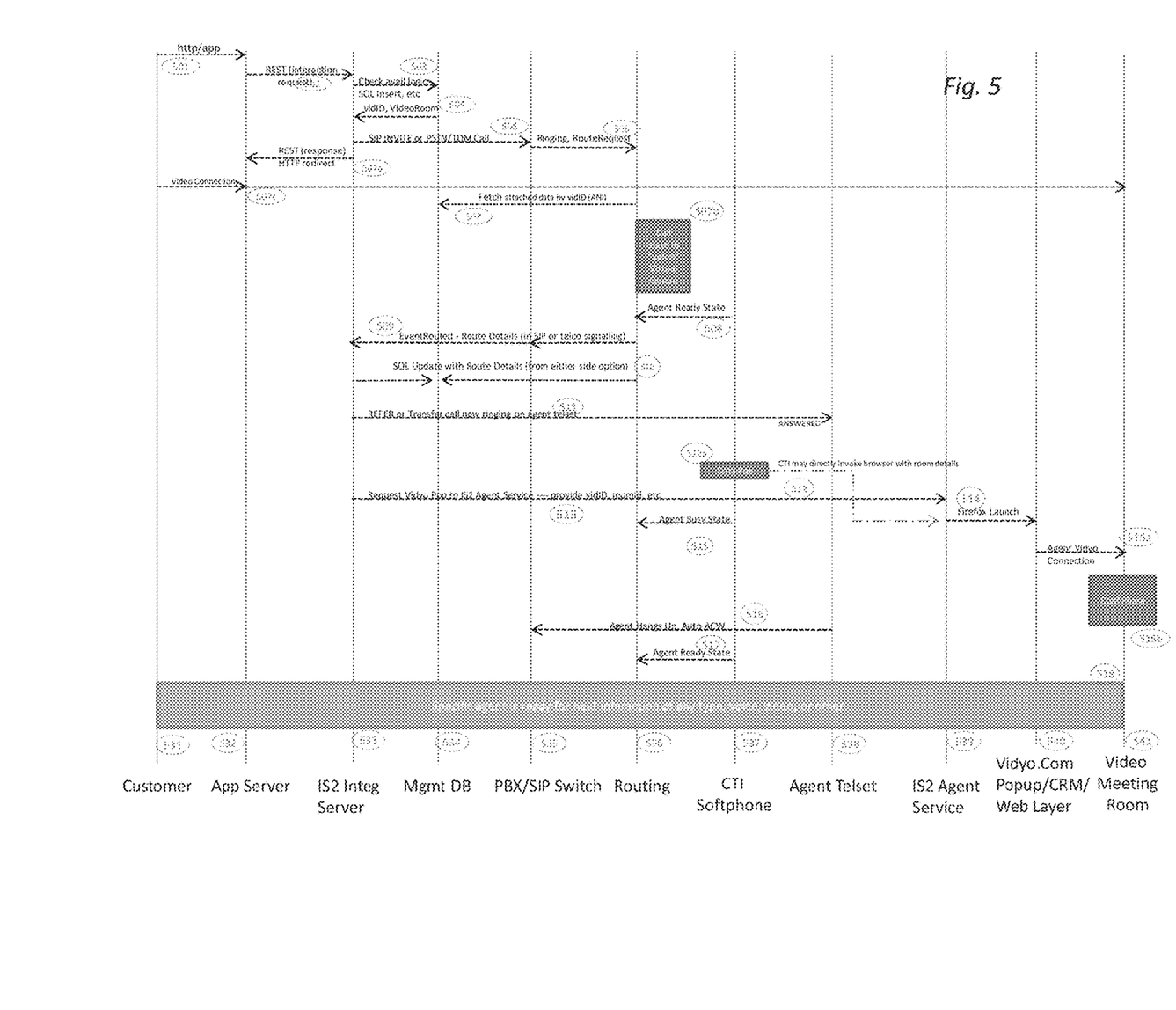
FIG. 5 is a timing diagram illustrating a video conferencing embodiment of the present invention in which a customer is connected to an agent for a video meeting in a video meeting room

In an embodiment of the present the invention, the code is included on the agent computer. This code, in one configuration, is a software process, that may run on the agent system, to early out functions such as launching video communication software, without intervention by the user (agent) by way of keyboard or mouse. In another configuration, it is built as a customization into a desktop software package, such as Interaction Workspace™. The capabilities, in either form, can be referred to the Agent Service 539. Several software packages are available that involve software which runs on the agent workstation, which agents may routinely interact with, to carry out their duties. In an embodiment of a software process, it is a web server, written in code (it binds a network socket and listens). After URS selects a target agent, URS does a web service call or a HTTP-GET from the IP address of the agent's machine (this information can be stored or obtained by various means). The agent software process receives this request and spawns a web browser which is loading the video conference session. In one such embodiment, the software process may not need to query the database, but may be "pushed" (in the other words, be the recipient of) relevant customer data to launch the video conference software on the agent system, as shown by the example of URS invoking this software process by an HTTP GET. Similarly, this server or agent software service could launch any number of programs, applications, scripts, tasks, binaries, machines code on the agent system.

The configuration which is built-in to the primary CD desktop of the agent will look at the Origin or the attached data (defined as stored data attributed to specific call the contact center system), and will accordingly spawn a browser session to launch the desired communication medium.

The agent's system has now been instructed to enable communication (or it as simply a message or notification or task) via this alternate medium. This might have come in to the agent as a simple voice call, but since the signaling ultimately carried a specific reference in a database, it is far more meaningful and the possibilities are endless.

Figure 7:
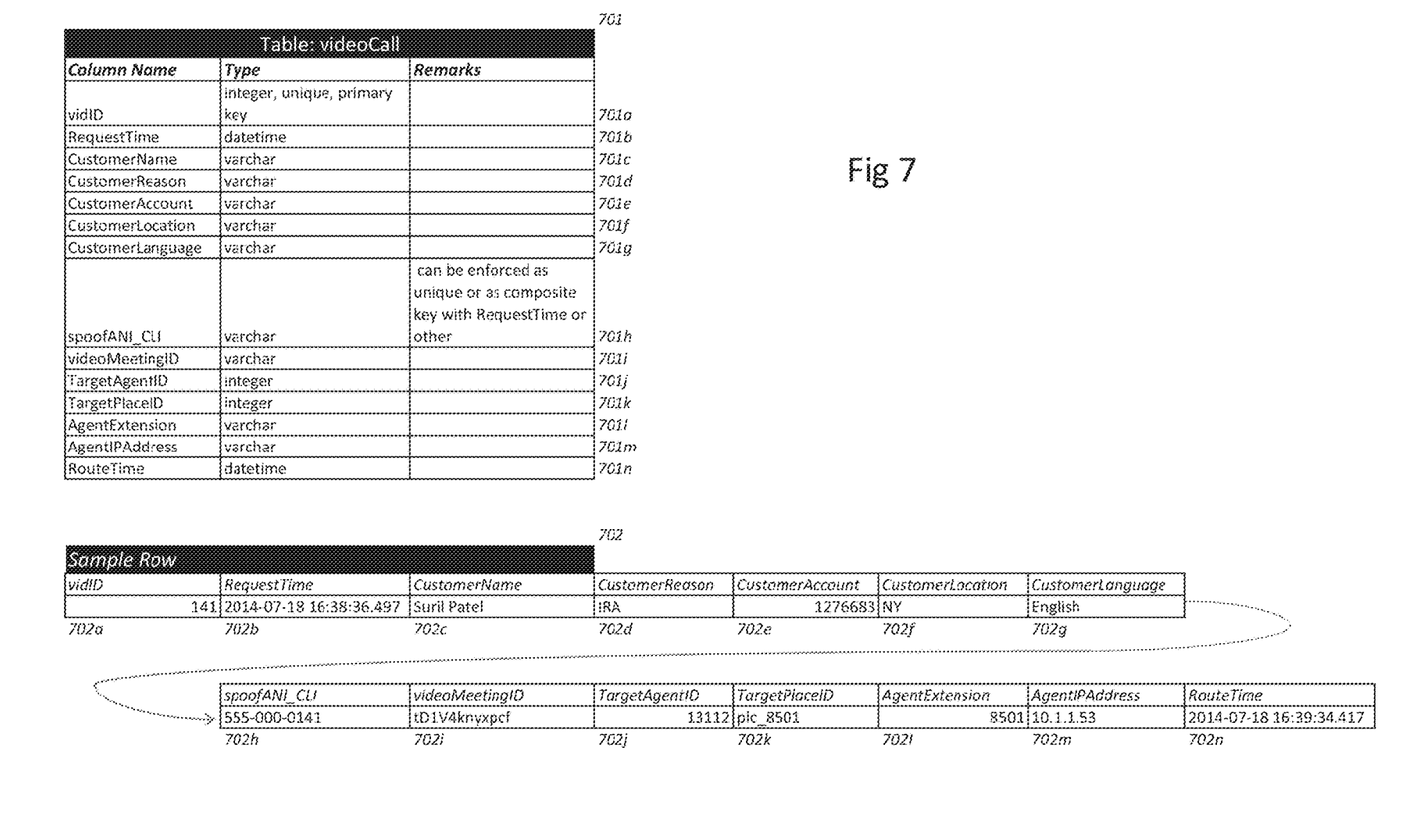
FIG. 7 shows a database table design according tot the video conferencing embodiment of the present invention.

For example, in exploring a specific "user story" (a very specific instance of execution) of a video embodiment, a customer, named Suril Patel, wants to see how his retirement savings is performing. He visits the website of his brokerage (financial institution) and "logs in" ("signs in", or authenticates using his unique username and password combination). He sees the balance of his Individual Retirement Account, and next to it, sees a button (or clickable link) which reads "Click here to video chat with a financial advisor". Suril clicks this link, thereby establishing a request to have a video conference with an agent of this financial institution. Referring to FIGS. 5 and 7 for the "user story", this request 501 for the video conference thus originates from the customer 531 and in one institution's example, maybe a HTTP POST command. The institutions web application server 532 receives this request and relays REST protocol request 502 to the Integration Server 533, containing details it knows about the customer, presently signed in and viewing the website. The Integration server 533 receives this REST command, rich with data, and processes it. As the time of the request fails with non-holiday operating business hours, the integration server 533 relays a SQL "Insert" command to a Database 534. The database 534 takes this command, which is the add data to the videocall table 701. The addition of the data, leads to the creation of a new row 702 in the table, which is unique identified by its vidID 702*a*. As in the data definition 701*a*, the vidID is generated by the database, automatically incrementing, as a row is added. The time the request is received, 701*b*, is placed into the new row as a cell 702*b*. As the customer name, customer reason for wanting to have video chat, the customer's account number, their geographical location, and their language preference is all known by the web application server, it is passed in REST 502, and propagated in SQL 503, to fill RequestTime column 701*b*, CustomerName column 701*c*, CustomerReason column 701*d*, CustomerAccount column 701*e*, CusteromLocation column 701*f*, and CustomerLanguage 701*g*. For this user story, we see RequestTime cell 702*b*, CustomerName cell 702*c*, CustomerReason cell 702*d*, CustomerAccount cell 702*e*, CusteromLocation cell 702*f*, and CustomerLanguage 702*g*, being populated. A virtual video conference room is assigned to this vidID. This videoMeetingID is essentially a unique key, which two or more participants present to the video conferencing system, that groups those participants into the same conference. The vidID and roomID are given 504 to the Integration Server 533 that then generates an internal telephone phone call 505, which is the accepted medium in this user story. This telephone call, when it is received by the contact center phone system' switch, appears as if it is from the calling party of 555-000-0141. As per the user story, the vidID is 141, and in this implementation, the spoofAI_CLI data field 701*h* can be derived using 5,550,000,000+<vidID> (where vidID has a system maintained maximum of 9,999,999). The 10-digit sum is represented as a phone number, of 10 digits also. This value is stored in spoofANI_CLI cell 702*h*. The call as it rings 506 is relayed to routing, where routing will queue the call if necessary, and select an agent for the call. In this "user story", routing takes the optional step of looking at the origin phone number, dissecting out the vidID and querying 507 the database. It sees that Suril Patel speaks English, and wants to talk to about his IRA account. Routing 536 decides it wants to have Suril speak to an agent who specializes in IRA and is fluent in English, thus en-queues him 507*b*. Somewhere in the contact center, such an agent, becomes available to answer such a call (perhaps he or she hung up their phone after speaking to another customer). This agent 537 effectively shows "availability" 508 to the routing component 536 among the contact center system(s). The integration server 533 is informed that an agent is selected. The optional step of a SQL Update 510 is taken, in this story, via routing 536, to put the agent details in the database. An SQL Update statement 510 is sent to the database, which goes to the row 702, and fills in the previously empty fields of TargetAgentID cell 702*j*, TargetPlaceID cell 702*k*, AgentExtension cell 702*l*, AgentIPAddress cell 702*m*, and RouteTime cell 702*n* (based on the specification defined in TargetAgentID column 701*j*, TargetPlaceID column 701*k*, AgentExtension column 701*l*, AgentIPAddress column 701*m*, and RouteTime column 701*n*). The call generating engine component within the integration server 533, is now effectively creating a phone ringing behavior 511 on the agent telephone 538, which in this user story is co-mingled with CTI Softphone 537 capabilities. By this, the CTI software 537 can control telephone functions of answer or disconnect. The softphone is informed 512*a*, that call has come to the agent and that the agent has answered it. In this user story, however, it is the integration server 533 that now tells the agent's computer to start the video conference application. As the integration server 533, has access to the database row 702 (which it can find, by querying for all rows with vidID=141 with a request time in the last hour) trends an HTTP GET command 513 to a simple software process (described above) running the agent's computer. This software, machine readable code or instructions, running, on the, agent's hardware (workstation, computer, mobile phone, tablet) can be referred to as the IS2 Agent Service 539. The HTTP GET command is handled by the service and the computer instructed to start the video conference, which in this user story, involves starting Firefox™, to a URL 540 containing the videoMeetingID 702*i*. Simultaneously, as the agent is about to join a video conference, the CTI software tells the contact center systems, in this user story, the router, that the agent is "busy" and thus cannot accept a call at this time 515. By this, the agent is in the same unique video meeting room 541, as the Suril. Suril was previously informed 507*a* of this of video meeting ID, and later joined it 507*c*. These activities (receing the details 507*a* and joining 507*c*) occurred in parallel or simultaneous to activities between call ringing 506 to browser launch 514). Suril now receives advise from the agent of the institution by what can be considered a working phase 515*b*. Once Suril is satisfied, the agent leaves the video conference, and also hits the disconnect option on the softphone (516). In this instance, this terminates the active telephone call, known to 535 and 533. In this user story, the agent is automatically put into an After Call Work mode, after a call. The agent notes down his/her remarks from the video conversation with Suril, without any disturbance of another call. Once the agent is done, he/she instructs his/her softphone to show "available", 517, which then allows the router to select the agent again and relay another call 518. The net effective is that Suril was able to receive high-quality customer service, over video, but an institution, for which contact center systems previously did not support video communication.

FIG. 5 provides additional implementation details to the example of this invention in the video domain. Further, elaborating on the "user story" above, the customer 531 can be using a web browser, mobile application, or similar interface, which will invoke art appropriate server. This server 532, operated by the business in question, may be a web server, a mobile engagement server, or similar application server which can communicate with customer endpoints. The protocol fix the message 501 coming from the customer to app server may be HTTP, SOAP, XML RPC, REST, or any open or proprietary messaging protocol applicable and accepted on the internet, intranet, LAN, or WAN. The IS2 (Integrated Systems Solutions, Inc) implementation of the Integration server 533 accepts RESTful calls or HTTP GET requests, which can be substituted with SOAP, XML RPC, JMS, Tibco™, and various server-server options (for 502). The Integration Server 533 will accept this request details relayed by the app server, and execute any desired logic, including, but not limited to business logic, such as a validation for hours of operation, locale, emergency status, resource unavailability, holiday status, etc. Such logic may be implemented at the app server 502, and in many cases may not be required. Based on the specific logic, the IS2 integration Server may respond to app server, with appropriate messaging, to curtail further processing of the customer video chat request. If necessary validation completes successfully, and the request is to be further processed, SQL 503 will be generated for relay to a DBMS (Database) 534. Named pipes and other database instruction protocols may be substituted, and further non-database means of information storage and retrieval may be used, examples include in-memory data structures, RAM disks, etc. A unique identifier will be generated, "vidID", for this video request, and relevant information as desired will stored, attributed to this ID, such as, but not limited to name of the customer, account information, language preference, reason for the request, date and time of request, if/she is on web browser or mobile application, and so on. Place holders, or empty cells may exist in the same row 702 for Video Meeting Room information, IP Address, URLs, assigned agent, agent's telset or workstation details, SIP or ANI information used when generating the "dummy" call, time of route, etc. The database may store video room information 701$i$, and maybe able to assign this via stored procedures or similar, and may serve 504 that back to the Integration Server. The integration server could also have this capability, internally, or the management of rooms can be done via a third party solution. Some solutions rather than predefined meeting rooms, may have implicit or explicit generation of ad-hoc conference rooms. The integration server takes the unique vidID and any rooming or conference details, and begins the sequence to generate a dummy telephone call. The software or system to generate the dummy call (or plain SIP INVITE is acceptable) can be internalized or external to the integration server. Various software and systemic solutions exist, which accept requests, messages, triggers to spawn such a call or SIP invite 505. Software libraries, Genesys™/Avaya™/Cisco™ built solutions, or even outbound IVR or dialer, could be configured or modified to serve as a call generating mechanism. This mechanism may embed the vidID and/or video meeting room information in the protocol information of a SIP, H.323, XMPP, or similar type of call. The mechanism may simply use a generated unique originating phone number, established as an attribute in the DB for this vidID, and passed as part of CLI or ANI, in an analog, POTS, PSTN, SS7, TDM, ISDN, or similar call, achievable using Dialogic™, Sangoma™, or similar systems. In this latter instance, the corporate PBX would receive a call from a phone number that would be easily discernable as a dummy originating number. It is widely known that the 555 area code does not exist. As this originating number is retained and visible to the agent and the agent's systems/softwares, it will then be dissected, and used a key to retrieving video conference details from the DB table. In the former case, where details are embedded in the protocol information, the corporate SIP Server, IP PBX, (Voice) Gateway, Session Border Controller, XMPP server, SIMPLE, SCCP call manager, etc (535), will be able to also propagate the information. This can continue in the protocol as part of transfer, forward, refer, redirect, or similar, but also as part of CTI or similar mechanism, such as, but not limited to attached data and UUI. Ultimately, the call generator, by either of these two paths, generates a dummy "call". The PBX 535 or Switch layer (SIP, SCCP, Cisco™ UCM, or other) will look to route 506 the call, either using an internal or external mechanism. Such a mechanism could be referred to as an ACD, Universal Routing Serve (trademark of Genesys™), employing, strategies, scripts, calling trees, vectors, and such. In general, this mechanism will have access to the availability of agent, and in the traditional contact center, assign phone calls to agents who are not on a call and deemed "ready". In these and expanded multi-channel contact centers (with multi-channel routers), the general principle of agent state and presence is important, in determining to where to route. The router 536, if capable, may also leverage information obtained from the protocol of the call, the attached data/UUI, or the ANI/CLI. Some routers accept programmable routines, that execute while routing calls, which could perform a database lookup to obtain information which can enhance logic on where or how to route the call (such as querying the vidID 507). This capability may improve business outcomes, but is not essential to this invention. Once the router mechanism, which may be combined with the switch/PBX layer, determines the route, it is executed, resulting in the call generator mechanism being one endpoint and the agent (or relevant agent software, hardware or system) being the other endpoint. The call generator mechanism in some cases would know details of the agent endpoint, which would be available to the general software routines of the Integration Server. Either the router layer 536, PBX layer 535, or Integration Server 533 layer would update 510, the DB 534 with the details of agent or route selected. On the agent side, a call is now ringing 511 on their phone (which could be software-based), or a protocol message is delivered to software running on the agent workstation.

In one phone example, the agent telset rings with caller ID showing as 555-000-0001 (or it could be 999-9999). Operationally, the agent has been trained to understand this is system generated dummy call, where he/she picks up (answers), but will not be speaking to a customer. In traditional contact centers, the "pick-up" generates an "off-hook" (or similar, depending on vendor terminoloy) event to the PBX/Switch 535. This event is sometimes part of the digital phone TDM protocol, or analog domain, observed by voltage change. In an embodiment, the PBX layer 535 features, either internally or externally, computer telephony integration capability. The purpose of this capability is to provide real-time information of agent state and presence to external software clients (it may be also used by the router and the router may also provide such capability). As the agent telset 538 is picked up, the CTI capability will show that the agent actively on a phone call and further will show the origin of that phone call. An external software client, querying for this CTI capability, would thus have this information A CTI Softphone 537 is defined here as a software which maintains a (near) real-time connection to this CTI capability, to essentially "monitor" the activities of a phone extension or agent telset. (Sonic softphones do perform "third-party" call control, such as the one developed by IS2. Also, some physical phones have the capability to report states, such as ACW, busy, ready, eliminating the need for a CTI softphone.) This CTI Softphone software would thus know that a dummy call has landed 512*a* on the agent phone and was answered by the agent. This software can be expanded, extended, or modified to query the DB or the IS2 Integration Server for video room information, and launch software or routines, on the agent workstation, to leverage the information and join a video conference.

The phone call example, described above, can have various analogous configurations and embodiments, where SIP and other protocols are employed. Rather than a "ringing" as described, the protocol may message an agent software by another means. The agent software that "answers" the message would reciprocally inform the CTI layer and/or Router layer, which is generalized mechanism for maintaining and/or serving state and presence information of the agents. The knowledge of when agents are busy and when they are available for work is important to effective contact center operation.

Figure 6:
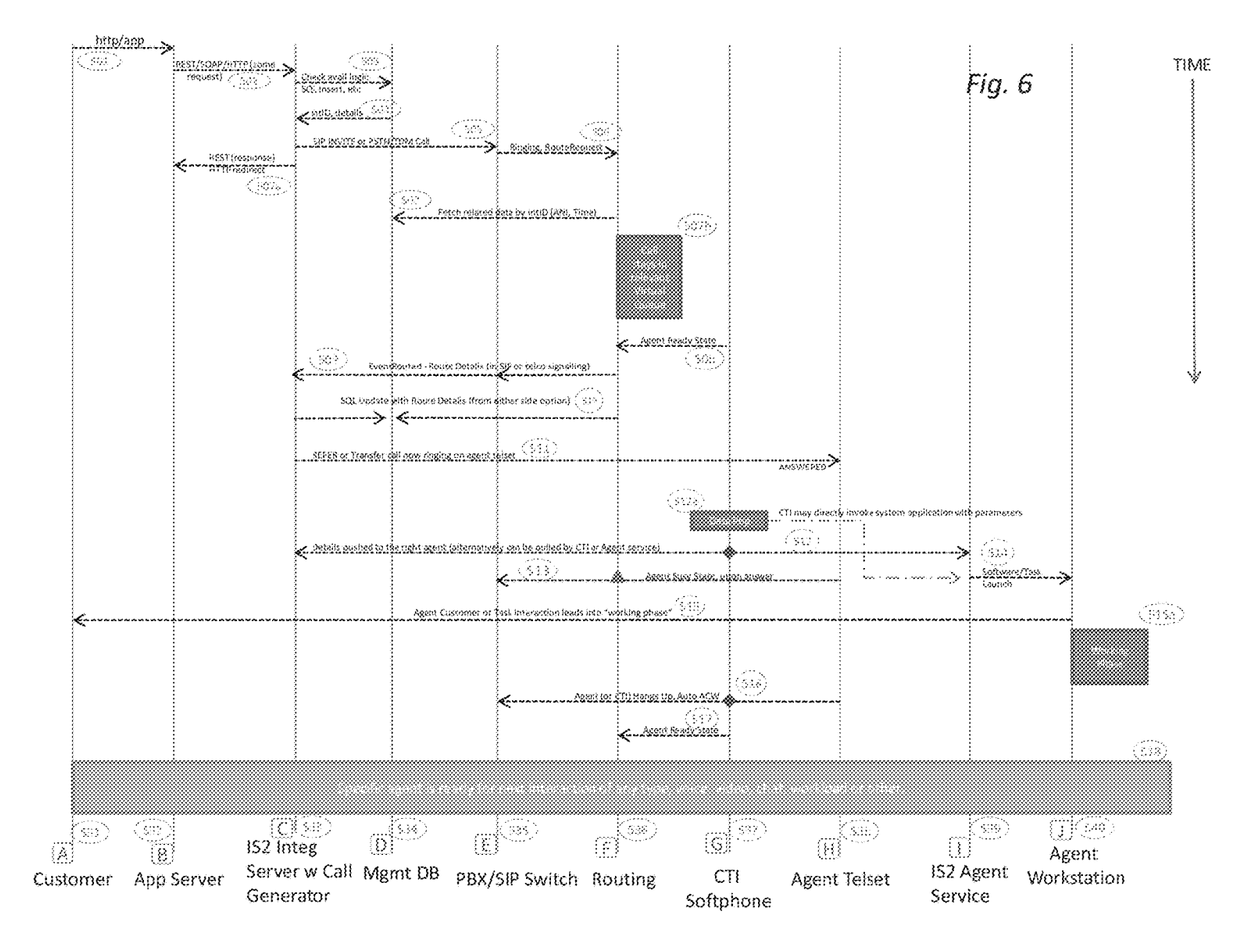
FIG. 6 is a timing diagram illustrating another embodiment of the present invention in which a request is delivered to the agent, and the agent and customer are connected, if necessary, as per the specifications of the channel, either directly, indirectly via third party, or both.

Embodiments of the present invention present a logical component referred to as the "IS2 Agent Service" 539 in FIG. 5. This component may exist on the agent workstation as a systray application, a software process, an application, a server, or maybe implemented as an extension or modification of a CTI Softphone. Just as with a CTI softphone, which in one embodiment it may replace, it does not have resident on the agent workstation. The function of this component in the video example, is to the launch 540 a web browser, on the agent workstation, with the URL of the Video meeting room 541. The video meeting room can be any such construct or software/hardware medium as relevant to commonly known WebEx-, GoToMeeting™, Skype™, BlueJeans™, VSee™, Connect&Share™, FreeConferencing™, Microsoft™Lync™, Google™, Hangouts™ among others. This principle can be extended to launching any software, pre-loaded either with the communication medium and connection details in question, or with the details of the task to be performed. For example, if it is chat, the chat application could be launched such that the customer and agent are able to directly chat. This agent service, may have the capability of monitoring a software-based phone or other contact center connected software, where it can also see that the dummy call or the protocol message, and use that to carry out its function. It may also have capability limited to just launching the application, where it is triggered or invoked externally. For example, where it contains a simple listener for HTTP requests, the integration server would send an HTTP request to start the web browser (once it receives information that the dummy call has been answered). Some operating systems may support Remote Procedure Call capability, or remote shell access, or similar, where the command to launch applications on the workstations is available from outside the machine. In such instances also, the integration server 533 may directly launch the agent browser (or applicable application), without the need for a separate Agent Service or conversely CTI Softphone. Once the browser, or generally the relevant application, is launched, the agent enters the "working phase" 515b (also known as conference phase). In the phone call scenario, as the phone is still "off-hook" (the agent appears to be actively on a telephone call), no new phone calls, or video interactions will be assigned to this agent (until he/she becomes available). The agent can thus carry out the video conference or task. Any reporting system, connected to the contact center systems discussed, will know that the agent was on a phone call with 555-000-0001 for X minutes and Y seconds, in the simple example. Thus, the reporting can be extended to show that the agent was on a video conference for such time. Aggregate statistics would continue normally, and queries could cross-join to the DB table to provide more rich reporting. In this example, once the agent hangs up the phone, they become available (or in ACW—after call work mode, depending on contact center configuration). Similar analogous functions would be present for embodiments not using a traditional physical telephone. Ultimately, when the task or conference is completed, and the router system becomes directly or indirectly aware that the agent is available 517, he/she may 518 receive another traditional customer phone call, or a dummy call, which could be similarly masquerading over a video conference request, communication request over another channel/medium, and a work assignment FIG. 6 takes a generalized approach of FIG. 5. [A also referenced as 531] is any customer, source system, software mechanism which either wants to communicate or needs some work performed by contact center agents. [501] is a network delivered message to a respective intermediary server, [B also referenced as 532]. If desired, [501] can also go straight to [C also referenced as 533], or be combined with or replace [502]. In the figure, [502] is any network message to [C] containing details for communication or work request. [3] can be any logic, routine, script, decisions, algorithms that are required to determine how to process the [502], finally serializing relevant information to a [D also referenced as 534] (a storage mechanism), such that it can be uniquely retrieved in the future. [504] returns unique identifier information such as an interaction ID, or a key (possibly composite) as reference to what was serialized by [503]. [C] will then issue an isolated, accepted instance of communication to [E also referenced as 535]. [E] will then invoke [506], which may be carried out internally, if the capability of [F also referenced as 536] is available (i.e. E and F, maybe unified). E and/or F may perform [507] (to have intelligent functionality), or may simply perform [9] if an agent is available, or will remain in a queue state for the execution of this instance until an [508] occurs. [507a] maybe performed for some customers, who want provide a status update and/or improved UI experience for A and/or B. [507a] can occur later in timing as well, and can be performed by C, F, [G also referenced as 537], or [also referenced as 539], depending on when. [510] is performed for future reporting purposes, and can provide an alternate data store querying key for [G] or [I]. [511] leads to the extension of the communication instance [505], appropriately landing on [H also referenced as 538]. [H] and [G] may exist unified in one system, software, hardware, or both. At this point G, I, F, said/or C may each be aware of the details of [511], in addition to [E] and [H], of course, G, I, F, and/or C may be connected indirectly or directly to E and/or H, to monitor or obtain status, and thereafter carry out [512] against [C] or [D] (note: D could reside in or be unified with C, or C may be a pathway to interface to D, instead of open SQL access to D). C, E, F, G, H, or I can establish the result of [513] by generating a system-known busy state for associated agent. G, I, F, and/or C may have access and capability to launch software or commands on [J also referenced as 540], to thus invoke and/or perform [514]. [515] represents the activity, either communication or work assignment, which the agent will perform using [H]. [15] may involve any entity, A to I, systems/entities outside of these, multiple systems/entities, or no other systems/entities. When the activity or work is completed, the agent will close it by way of H (ex. Hang-up or disconnect), G (ex. button listener) and/or [I] (ex. System or application monitor), which completes [516], and thus [517] is resulted within E and F.

Figure 8:
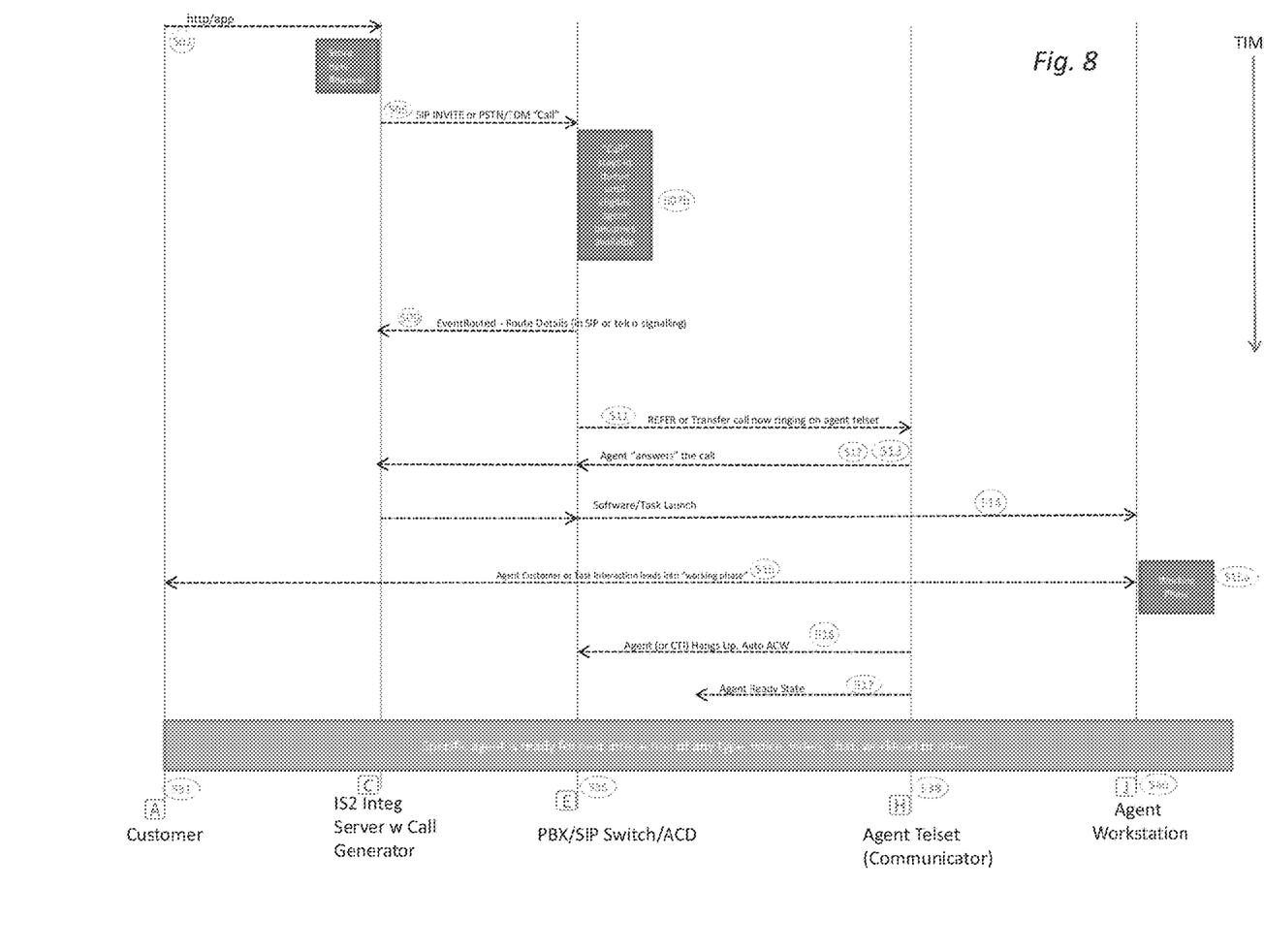
FIG. 8 shows another embodiment of the present invention in which components required to implement the methods and systems of the present invention can be reduced.

FIG. 8 shows another embodiment of the present in on in which components required to implement the methods and systems of the present invention can be reduced, that is, where some of the logical component functions have been merged, or eliminated. While some functionality is reduced, the embodiment of the present invention can still perform the goal of assigning a communication or non-communication activity, in a call/contact center environment that does not explicitly define and/or [manage/assign/route] that activity. Here, A (referable to as 531 and 101) will directly or indirectly present the activity request C (referable as 533 or 103). C will store it (the location and means of storage is irrelevant), such that it can be uniquely identified and accessed later. C still will communicate to E (referable as 535 or 105), which here is the existing contact center infrastructure, using a fabricated instance of the interaction type that the contact center system does support. The system then routes this to an agent (based on whatever system or business, including but not limited to language preferences, skill level, location, etc), and the agent answers. [509], [512], and [513] can actually happen together, depending on the implementation. [H] (referable as part of 106 also) here can be seen as a "communicator", taking the necessary capability to effectively answer an interaction, show that it busy, and disconnect from the interaction, to the contact center systems/infrastructure. It need not have additional capability, as E and C can fill the gaps in functionality. Upon on answer, C or E can manipulate J (with or without using H). As with before, this initiates the working phase, where [515] may direct to multiple systems, A, and/or no entities. [H] carries out the functionality to terminate the interaction, which is reported to the infrastructure, and can explicitly (or it may be derived implicitly) establish the agent as ready for the next interaction.

FIG. 7 shows a database table design according to the video conferencing embodiment of the present invention. Supplemental tables, data structures, algorithms, systems, hard-coded logic may exist to store agent details, system details, IP address information, and any pertinent information for completing the effective assignment to work with customer/account information to qualified agents. Here, the Integration Server effectively creates a new record for each video conference request, and such would have a unique vidID 701a. Several sample attributes of this vidID are suggested and shown. The vidyoMeetingID is a sample of the ID of the video conference room that can be used on Vidyo's Portal. It is within this room that both the customer and agent will join, to hold a conference with each other. SpoofANI_CLI 701h stores the originating phone number, embedded with the dummy phone call. In a SIP or other protocol domain, the origin or from information can be stored here. This column can also be forced to be unique, either by itself or can be combined with another column, such as RequestTime 701b, to discern a unique key. As most contact centers have an idea of traffic, suppose 555-xxx-xxxx is used. As an example, if the desire to query for 555-235-2346, it is unlikely that system would generate two of these, in the last hour, as that would suggest it looped through 999-9999, thus using a 1 hour time window can assist in uniqueness. It can be assumed that the permanent or shift-based relationship, between Agent, Agent Name, AgentID 701j, Agent Extension 701L. Agent's workstation IP address 701m can be maintained in an existing contact center system. If not, of course, such data and relationships can be stored in a table, but we need not provide a sample for this, as it is assumed. In some systems, a place ID 701k may exist, which could be pertinent in providing a reference to a phone system location, extension, identifier, etc, as relevant to that system. Some of the agent details may not required on a row by row basis, as the agentID 701j could serve as a foreign key. This is a sample, which simply depicts that the agent workstation IP address is ultimately attributed to the video conference request, where an application will be launched (remotely or by way of a local service) to connect to the video meeting room.

Figure 9:
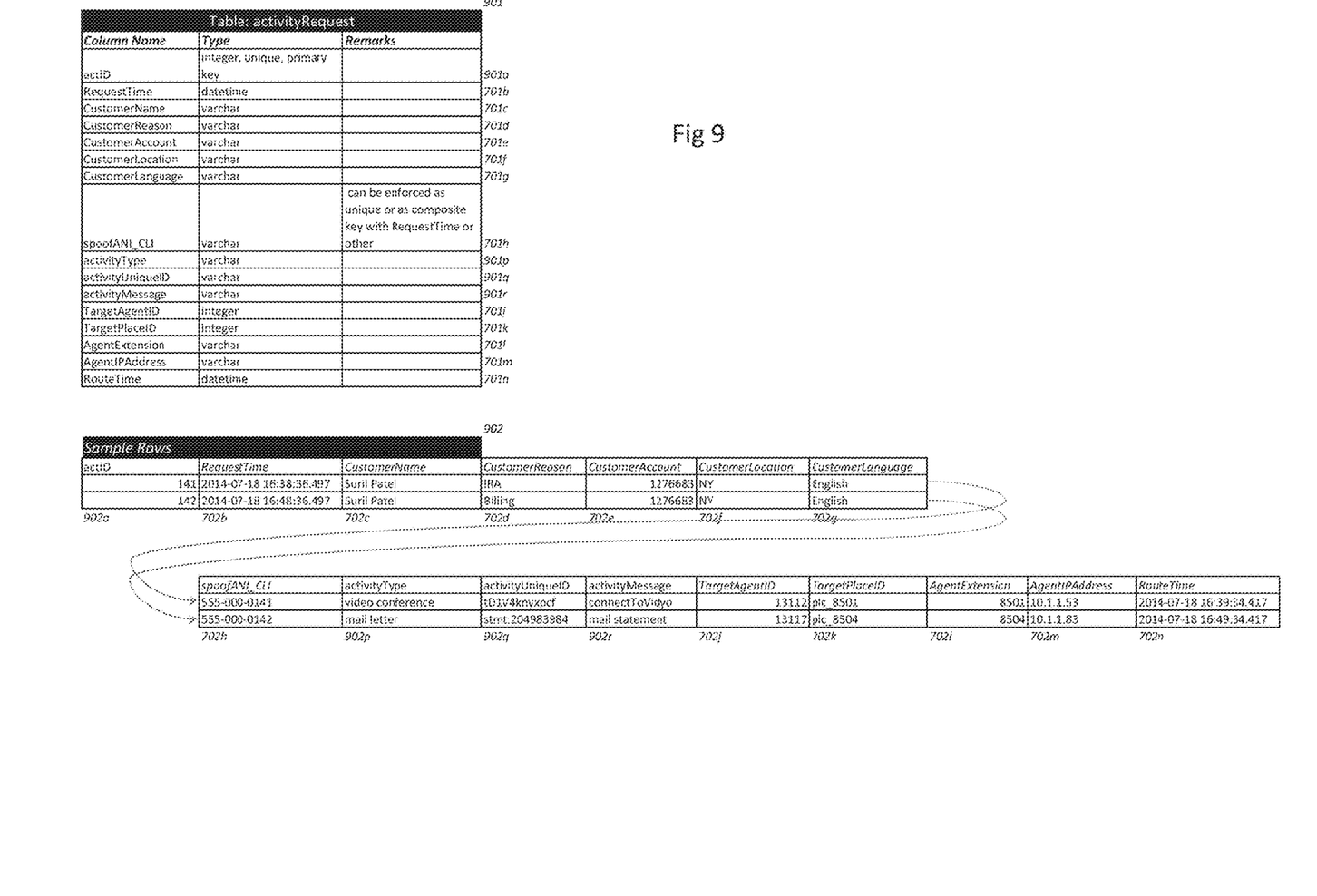
FIG. 9 shows a database table design according to another embodiment of the present invention.

FIG. 9 shows a database table design according to another embodiment of the present invention. That is, FIG. 9 depicts the data design for an embodiment that is not limited just to video. Here, a sample database table design to implement the embodiment is applied for agent activities, including, but not limited to interactions, tasks, and other assignments. Supplemental tables, data structures, algorithms, systems, hard-coded logic may exist to store agent details, system details, address information, and any pertinent information for completing the effective assignment to work with customer/account information to qualified agents.

The modified table, activity Request 901, takes some of the same design as 701. Here a unique activity ID: actID 901a is used, which is, further qualified by an activity type 901p. The types of activities can include (not limited to) video conferencing, chat, SMS, email response, or simple tasks, such as mailing a letter, and various others, as desired by each business. The unique ID 901q for such activity can be stored here, taking from the previous example above, the Vidyo Meeting. ID is stored. Namely, this activityUniqueID 901q may be a foreign key to another database table or system. It may also be decided to deliver the message 901r regarding this activity. The remaining sample attributes as discussed with vidyocall example can also apply. Sample data from activity based embodiment are shown in 902. The fields: actID cell 902a, activityType cell 902p, activityUniqueIDcell 902q, and activityMessage 902r are appropriately populated. While the present implementation uses a table similar to one shown in FIG. 9, the embodiment shown in FIG. 8, can be implemented in numerous ways, using alternate means of storage, such as, but not limited to, in-memory trees, data structures, hash maps, system files, in memory data streams, buffers, memory objects, named pipes, etc. It should be known and commonly understood, the labels of the data may vary. Supplemental tables, data structures, algorithms, systems, hard-coded logic may exist to store agent details, system details, IP address information, and any pertinent information for completing the effective assignment to work with customer/account information to qualified agents. The purpose of including a sample data design is simply to reinforce the functions and methods of the invention, as shown in the other figures and described herein.

In the foregoing description, for the purposes of illustration, methods were described in a particular order or execution sequence (with occasional explanation of possible changes). It should be appreciated that in alternate embodiments, the methods may be performed in a different order than that described. It should also be appreciated that the methods described above may be performed by hardware components or may be embodied in sequence of machine-executable instructions, may be used to cause a machine, such as a general-purpose or special-purpose processor or logic circuits programmed with the instructions to perform the methods. These machine-executable instructions may be stored on one or more non-transitory computer readable mediums, such as CD-ROMs or other type of optical disks, floppy diskettes, ROMs, RAMs, EPROMs, EEPROM, magnetic or optical cards, VMDKs, VDIs, flash memory, or other types of machine-readable mediums suitable for storing electronic instructions. Alternatively, the methods may be performed by a combination of hardware and software.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed is:

1. A method for establishing a video conference between a customer and a call center over a voice interaction routing system, the method comprising:
   receiving a request for a video conference from the customer at a server that is configured to communicate with the voice interaction routing system;
   generating, using the server, a unique dummy phone number for the request that is routable over the voice interaction routing system;
   acquiring, using the server, associated data from the customer and the request, and storing the associated data together with the unique dummy phone number in a database;
   generating, using the server, a call to the voice interaction routing system using the unique dummy phone number;
   receiving the call at the voice interaction routing system and using the voice interaction routing system to route the call to a computer at the call center;
   determining, using the computer, that the received call has the unique dummy phone number;
   acquiring, using the computer, the stored associated data from the database based on the unique dummy phone number; and
   establishing, using the computer, the video conference between the customer and the call center using the associated data.

2. The method according to claim 1, wherein the voice interaction routing system only supports voice interactions.

3. The method according to claim 1, wherein the routing of the call to the computer at the call center is performed based on the associated data stored in the database.

4. A method for establishing a non-voice interaction between a customer and a call center over a voice interaction routing system, the method comprising;
   receiving a request for a non-voice interaction from the customer at a server that is configured to communicate with the voice interaction routing system;
   generating, using the server, a unique dummy phone number for the request that is routable over the voice interaction routing system;
   acquiring, using the server, associated data from the customer and the request, and storing the associated data together with the unique dummy phone number in a database;
   generating, using the server, a call to the voice interaction routing system using the unique dummy phone number;
   receiving the call at the voice interaction routing system and using the voice interaction routing system to route the call to a computer at the call center;
   determining, using the computer, that the received call has the unique dummy phone number;
   acquiring, using the computer, the stored associated data from the database based on the unique dummy phone number; and
   establishing, using the computer, the non-voice interaction between the customer and the call center using the associated data.

5. The method according to claim 4, wherein the non-voice interaction is an internet-based chat.

6. The method according to claim 4, wherein the non-voice interaction is an SMS.

7. The method according to claim 4, wherein the interaction is an e-mail.

8. The method according to claim 4, wherein the routing of the call to the computer at the call center is performed based on the associated data stored in the database.

9. The method according to claim 4, wherein the non-voice interaction is a task for a contact center agent to make an outbound call to the customer.

10. The method according to claim 4, wherein the non-voice interaction is a task for a contact center agent to send a facsimile transmittal of a requested document to a third party.

* * * * *